United States Patent [19]
Norton

[11] 4,280,523
[45] Jul. 28, 1981

[54] THERMAL RESPONSIVE COUPLING

[75] Inventor: James F. Norton, Berea, Ohio

[73] Assignee: The Hansen Manufacturing Company, Cleveland, Ohio

[21] Appl. No.: 50,952

[22] Filed: Jun. 22, 1979

[51] Int. Cl.³ .............................................. F16K 13/04
[52] U.S. Cl. .................................. 137/74; 251/149.6; 285/3; 285/187
[58] Field of Search ............... 137/67, 72, 77; 403/32; 285/2, 3, 187; 251/149.6

[56] References Cited
U.S. PATENT DOCUMENTS

| | | | |
|---|---|---|---|
| 2,805,089 | 9/1957 | Hansen | 285/321 X |
| 3,427,047 | 2/1969 | Mayo | 285/3 |
| 3,532,101 | 10/1970 | Synder | 137/75 |
| 3,677,515 | 7/1972 | Fassler | 137/72 X |
| 3,690,336 | 9/1972 | Drum | 137/75 |
| 4,088,436 | 5/1978 | Alferes | 137/74 X |

*Primary Examiner*—Harold W. Weakley
*Attorney, Agent, or Firm*—Yount & Tarolli

[57] ABSTRACT

An improved coupling is utilized to interconnect conduits which conduct a flammable fluid, such as LP gas. The coupling includes a plug assembly which is telescopically received in a socket assembly. The socket assembly has retaining elements or balls which engage an annular collar which extends around a body of the plug assembly. In the event of a fire or other condition causing heating of the coupling to a temperature above a predetermined temperature, the plug body is released from the collar and is ejected from the socket assembly to disconnect the coupling. Simultaneously with ejection of the plug body from the socket assembly, a valve in the socket assembly is closed to block a flow of flammable gas through the socket assembly. A single spring is utilized to perform the dual functions of ejecting the plug body from the socket assembly and closing the socket valve. In order to provide for releasing of the plug body from the collar when the coupling is heated to the predetermined temperature, the plug body and collar are interconnected by a body of material which fuses when the predetermined temperature is reached.

10 Claims, 6 Drawing Figures

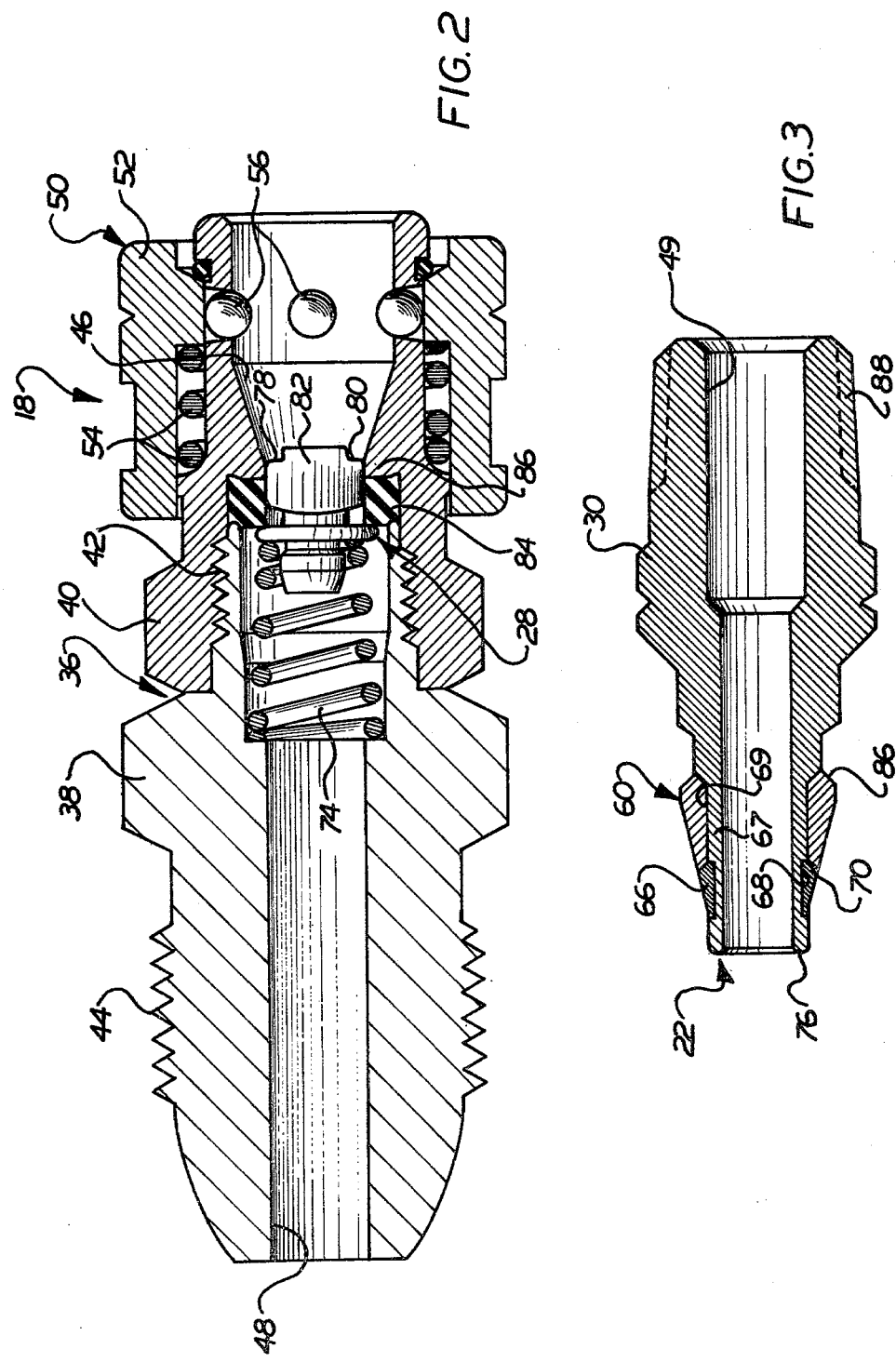

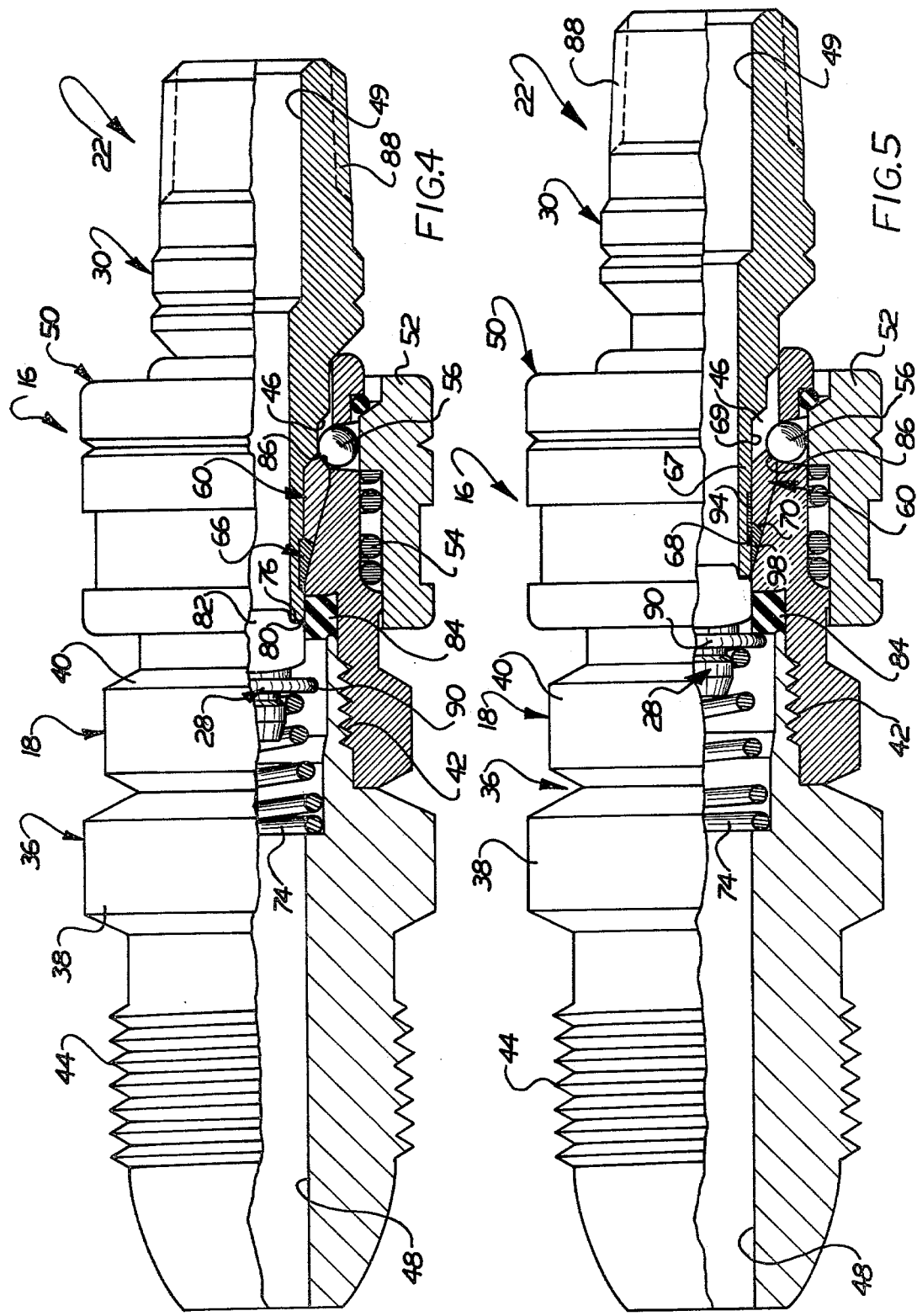

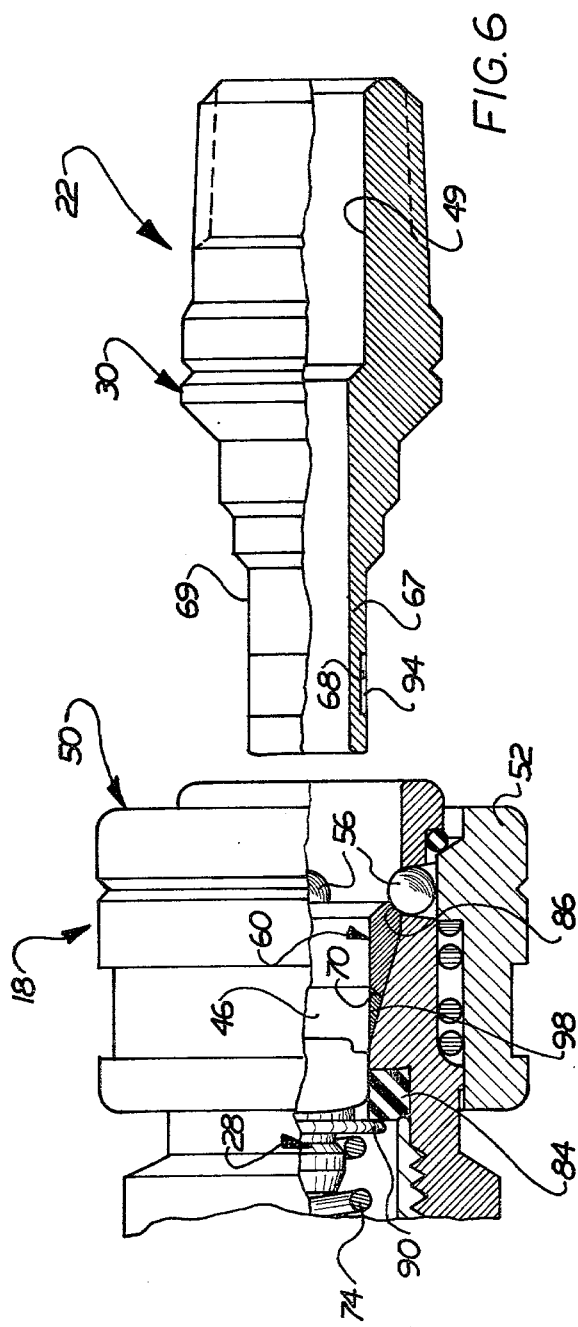

THERMAL RESPONSIVE COUPLING

BACKGROUND OF THE INVENTION

This invention relates generally to a new and improved coupling which is utilized to interconnect a pair of conduits. More specifically, the invention relates to a plug assembly which cooperates with a socket assembly in such a manner as to interrupt fluid communication between the conduits upon heating of the coupling to a predetermined temperature.

During the use of gas appliances such as cooking stoves and other devices, there is an ever present danger of a fire which will travel through the conduits to a source of a flammable gas. In order to prevent this from happening, couplings have been provided with a safety cutoff which closes a valve to block a flow of gas to the appliance upon heating of the coupling. Known couplings which may be used in such an environment and have safety cutoff devices which respond to excessive heating of the coupling are disclosed in U.S. Pat. Nos. 3,245,423; 3,532,101; and 4,088,436.

SUMMARY OF THE PRESENT INVENTION

The present invention provides a new and improved coupling which is used to connect a pair of conduits in fluid communication with each other and to subsequently interrupt the fluid communication between the conduits upon excessive heating of the coupling. The coupling includes a plug assembly which is telescopically received in a socket assembly. The socket assembly has a plurality of locking elements which engage an annular collar or ring disposed on a plug body to hold the plug and socket assemblies against movement relative to each other.

When the coupling is heated to a predetermined temperature, the plug body is released from the collar and is ejected from the socket assembly. At the same time, a valve in the socket assembly is closed to block flow of gas or other fluid through the coupling. The closing of the valve and ejection of the plug body from the socket assembly is accomplished by a single spring and is effective to disconnect the two conduits from each other.

In order to release the plug body from the collar when the coupling is heated to the relatively high temperature, a body of fusible material is utilized to connect the collar with the plug body. When a fire or other condition heats the coupling to a predetermined temperature, the body of material fuses so that it is no longer effective to hold the collar and plug body against movement relative to each other. When this occurs, a spring in the socket assembly moves a socket valve to a closed condition and causes the valve to push the plug body out of the socket assembly. When this happens, both the fluid connection and the physical connection between the two conduits is interrupted to prevent further spreading of a fire.

Accordingly, it is an object of this invention to provide a new and improved coupling which is utilized to connect a pair of conduits in fluid communication with each other and wherein a socket valve is closed simultaneously with outward movement of a plug body upon heating of the coupling to a predetermined temperature.

Another object of this invention is to provide a new and improved plug assembly which is used in a coupling to connect a pair of conduits in fluid communication with each other and wherein the plug assembly includes an annular collar which is connected with a plug body by material which fuses at a predetermined temperature to release the plug body and collar for movement relative to each other.

BRIEF DESCRIPTION OF THE DRAWINGS

The foregoing and other objects and features of the present invention will become apparent upon a consideration of the following description taken in connection with the accompanying drawings wherein:

FIG. 2 is an enlarged sectional view of a socket assembly which is part of the coupling shown in FIG. 1;

FIG. 3 is an enlarged sectional view of a plug assembly which is part of the coupling shown in FIG. 1;

FIG. 4 is a partially broken away view illustrating the manner in which the plug assembly of FIG. 3 is received in the socket assembly of FIG. 2;

FIG. 5 is a partially broken away view illustrating the manner in which the socket valve is closed and a plug body is moved outwardly from the socket assembly upon heating of the coupling; and FIG. 6 is a partially broken away view, similar to FIG. 5, illustrating the plug body fully ejected from the socket assembly.

DESCRIPTION OF ONE SPECIFIC PREFERRED EMBODIMENT OF THE INVENTION

Figure 1:
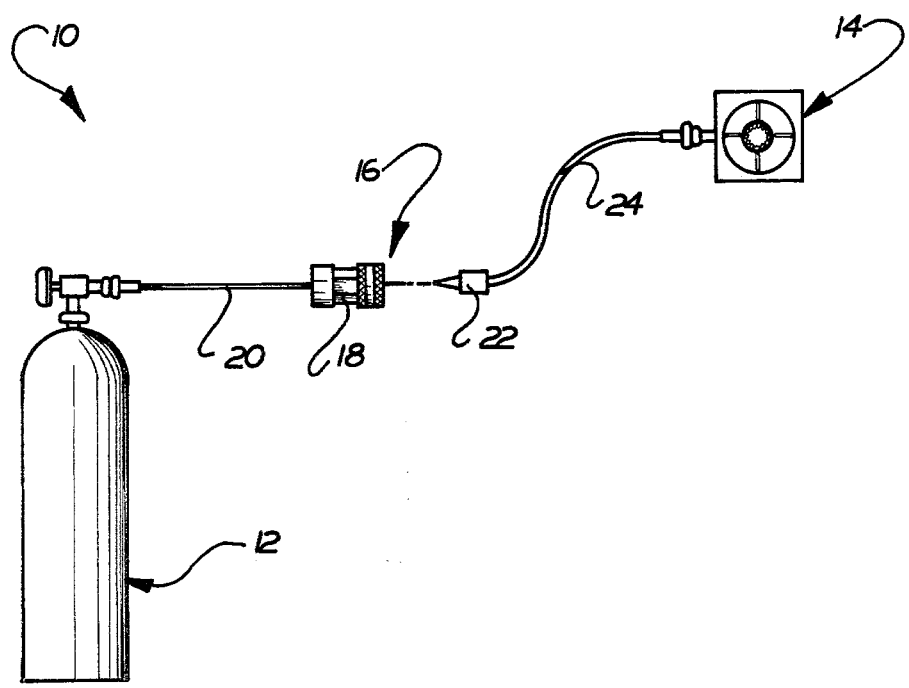
FIG. 1 is a schematic illustration of an apparatus which includes a coupling which is constructed in accordance with the present invention and is utilized to interconnect a pair of conduits.

An apparatus 10 (FIG. 1) includes a source 12 of flammable gas, such as natural gas, LP gas, etc., and a gas burning appliance 14. The appliance 14 is connected in fluid communication with the gas source 12 through a coupling 16 which is constructed in accordance with the present invention.

The coupling 16 includes a socket assembly 18 which is connected with a conduit 20 leading to the gas source 12. The coupling 16 also includes a plug assembly 22 which is connected with the a conduit 24 leading to the appliance 14. In order to connect the two conduits 20 and 24 in fluid communication with each other, the plug assembly 22 is telescopically received in the socket assembly 18 in the manner shown in FIG. 4.

In accordance with a feature of the present invention, when the coupling 16 is heated to a predetermined temperature due to a fire or other cause, a socket valve member 28 is closed (FIG. 6) to block a flow of gas through the coupling 16 and a plug body 30 is ejected from the socket assembly 18. Ejecting the plug body 30 from the socket assembly 18, as shown in FIG. 6, breaks the physical connection between the plug and socket assemblies and provides an external indication of closing of the valve 28. Although the plug body 30 is fully ejected from the socket assembly 18, the plug body 30 could be only partially ejected from the socket assembly 18 if desired. By closing the socket valve 28 and simultaneously moving the plug body 30 outwardly from the socket assembly 18 upon overheating of the coupling 16, the possibility of a fire being communicated between the gas burning appliance 14 (FIG. 1) and the gas source 12 is minimized.

The socket assembly 18 includes a metal socket body 36 (see FIG. 2) which is formed in two pieces by a pair of sections 38 and 40. The two socket body sections 38 and 40 are interconnected by suitable threads 42. The socket body section 38 is adapted to be connected with the conduit 20 (FIG. 1) by a threaded end section 44 (FIG. 2). The socket body section 40 has a socket chamber 46 which is adapted to receive the plug assembly 22 in the manner shown in FIG. 4. When the plug and socket assemblies 18 and 22 are interconnected as shown in FIG. 4, gas from the source 12 can flow to the appliance 14 along a path which includes a central passage 48 in the socket assembly 18 and a passage 49 in the plug assembly 22.

A locking assembly 50 is provided to hold the plug and socket assemblies 18 and 22 against axial movement relative to each other when they are interconnected as shown in FIG. 4. The locking assembly 50 is disposed on the socket body 36 and includes a cylindrical sleeve 52 which is urged outwardly by a spring 54 to hold metal locking elements or balls 56 in engagement with the plug assembly 22. When the locking sleeve is in the retaining position shown in FIGS. 2 and 4, the sleeve holds the locking elements 56 in a position in which they project into the socket chamber 46 into engagement with an annular collar or ring 60 disposed on the plug body 30 (see FIG. 4) to hold the plug body in the socket chamber. Upon axial movement of the sleeve 52 toward the left (as viewed in FIG. 4) the balls 56 are released for outward movement to enable the plug assembly 22 to be withdrawn from the socket assembly 18.

In accordance with one of the features of the present invention, the collar 60 is held on the plug body 30 by a body 66 of fusible material (see FIG. 3). The annular body 66 of fusible material may be formed of solder or other material which fuses or melts at a predetermined temperature when exposed to heat. To enable the material 66 to hold the collar 60 in place on a leading end 67 of the plug body, the material 66 is disposed in an annular groove 68 formed in a cylindrical side surface 69 of the plug body. The material 66 extends out of the groove 68 into engagement with an annular end surface 70 of the collar 60 (see FIG. 3).

When the body 66 of fusible material is heated to a predetermined temperature corresponding to its melting or fusing temperature, the collar 60 is released for sliding movement on the cylindrical outer side surface 69 of the leading end portion 67 of the plug body 30. This enables relative movement to occur between the plug body 30 and the annular collar 60. Therefore the plug body 30 can be moved out of the socket chamber 46 (see FIG. 5) even though the locking balls 56 continue to hold the collar 60 against axial movement relative to the socket body 36.

In order to connect the gas source 12 (FIG. 1) in fluid communication with the appliance 14, the plug assembly 22 is inserted into the socket assembly 18. At this time a circular leading end surface 76 (FIGS. 3 and 4) on the plug body 30 engages a pair of recesses 78 and 80 (FIG. 2) formed in a generally rectangular extension or guide section 82 on the closed valve member 28. The guide section 82 cooperates with a resilient annular valve seat 84 and a portion 86 of the socket housing section 42 to guide movement of the valve member between the closed position of FIG. 2 and the open position of FIG. 4. The construction of the valve member 28 is the same as a similar valve member in U.S. Pat. No. 2,805,089.

As the plug assembly 22 is inserted into the socket chamber 46, the leading end of the plug body 30 moves the valve member 28 inwardly from the closed position of FIG. 2 to the open position of FIG. 4. As this occurs, the valve spring 74 is compressed. At the same time, the locking balls 56 engage an annular side surface 86 on the collar 60. This enables the balls 56 to hold the plug body 30 in the socket chamber 46 against the axially outward force applied to the plug body by the spring 74 through the valve member 28. Once the plug and socket assemblies 18 and 22 have been interconnected as shown in FIG. 4, gas can flow from the source 12 through the socket passage 48 and open valve 28 to the passage 49 in the plug assembly 22. Suitable threads 88 on the plug body 30 connect the plug body with the conduit 24 leading to the appliance 14.

When the coupling 16 is heated to a predetermined temperature, the body 66 of material fuses so that relative movement can occur between the plug body 30 and the collar or ring 60. This enables the valve spring 74 to move the valve member 28 from the open position of FIG. 4 to the closed position of FIG. 5. When the valve member 28 is in the closed position of FIG. 5, a circular flange 90 on the valve member is disposed in abutting sealing engagement with the annular valve seat 84 (FIG. 5). The sealing engagement between the flange 90 and the valve member 28 and the valve seat 84 blocks the flow of gas from the source 12 through the socket assembly 18.

Simultaneously with movement of the valve member 28 from the open position to the closed position, the plug body 30 is moved outwardly from the socket chamber 46 by the spring 74. Thus, as the valve spring 74 moves the valve member 28 outwardly from the open position of FIG. 4 to the closed position of FIG. 5, the valve member moves the plug body 30 outwardly. As this occurs, the body of fusible material 66 tends to be divided into an annular portion 94 which remains in the groove 68 in the plug body 30 (see FIG. 5) and an annular portion 98 which remains between the inner surface 70 of the collar 60 and the side surface of the socket chamber 46. It should be understood that although the plug body 30 is ejected from the socket assembly 18, the annular collar 60 and a portion 98 of the body of fusible material 66 remains in the socket chamber. This is because the locking balls 56 prevent the collar from being pulled out of the socket chamber with the plug body.

In view of the foregoing description it is apparent that the present invention provides a new and improved coupling 16 which is used to connect a pair of conduits 20 and 24 in fluid communication with each other and to subsequently interrupt the fluid communication between the conduits upon excessive heating of the coupling. The coupling includes a plug assembly 22 which is telescopically received in a socket assembly 18 (FIG. 4). The socket assembly 18 has a plurality of locking elements 56 which engage an annular collar or ring 60 disposed on a plug body 30 to hold the plug and socket assemblies against movement relative to each other.

When the coupling 16 is heated to a predetermined temperature, the plug body 30 is released from the collar 60 and is ejected from the socket assembly (FIG. 6). At the same time, a valve 28 in the socket assembly 18 is closed to block flow of gas or other fluid through the coupling. The closing of the valve 28 and ejection of the plug body 30 from the socket assembly 18 is accomplished by a single spring 74 and is effective to disconnect the two conduits 20 and 24 from each other.

In order to release the plug body 30 from the collar 60 when the coupling 16 is heated to the relatively high temperature, a body 66 of fusible material is utilized to connect the collar with the plug body. When a fire or other condition heats the coupling 16 to a predetermined temperature, the body 66 of material fuses so that it is no longer effective to hold the collar 60 and plug body 30 against movement relative to each other. When this occurs, the spring 74 in the socket assembly 18 moves the socket valve 28 to the closed condition (FIG. 5) and causes the valve to push the plug body 30 out of the socket assembly (FIG. 6). When this happens, both the fluid connection and the physical connection between the two conduits 20 and 24 is interrupted to prevent further spreading of a fire.

Having described one specific preferred embodiment of the invention, the following is claimed:

1. A fluid coupling for use in connecting a pair of conduits in fluid communication with each other and for subsequently interrupting the fluid communication between the conduits upon heating of the coupling, said coupling including a plug body, a collar circumscribing and movably mounted on said plug body, socket means for receiving at least a portion of said plug body and holding said plug body against movement relative to said socket means while the conduits are connected in fluid communication, said socket means including means for engaging said collar to hold said plug body against movement relative to said socket means, and temperature responsive means for releasing said plug body for movement relative to said socket means when said temperature responsive means is heated to a predetermined temperature, said temperature responsive means including means for holding said plug body and collar against relative movement while the temperature of said temperature responsive means is below the predetermined temperature and for releasing said plug body for movement relative to said socket means and collar upon heating of said temperature responsive means to the predetermined temperature.

2. A fluid coupling for use in connecting a pair of conduits in fluid communication with each other and for subsequently interrupting the fluid communication between the conduits upon heating of the coupling, said coupling including a plug body, a rigid member movably disposed on an outer side surface of said plug body, socket means for receiving at least a portion of said plug body and holding said plug body against movement relative to said socket means while the conduits are connected in fluid communication, and temperature responsive means for releasing said plug body for movement relative to said socket means when said temperature responsive means is heated to a predetermined temperature, said temperature responsive means including means for holding said rigid member against movement relative to the outer side surface of said plug body until said temperature responsive means is heated to the predetermined temperature and for releasing said rigid member and plug body for movement relative to each other upon heating of said temperature responsive means to the predetermined temperature.

3. A fluid coupling as set forth in claim 2 wherein said socket means includes a valve member movable between an open condition enabling fluid to flow through said socket means and a closed condition blocking fluid flow through said socket means and spring means for moving said valve member from the open condition to the closed condition and for simultaneously therewith moving said plug body away from said socket means upon releasing of said plug body by said temperature responsive means.

4. A fluid coupling as set forth in claim 3 wherein said plug body has a circular leading end surface which engages said valve member to move said valve member from the closed condition to the open condition against the influence of said spring means upon insertion of said plug body into said socket means, said valve member being effective to apply a force against said leading end surface of said plug body to move said plug body away from said socket means upon releasing of said plug body by said temperature responsive means.

5. A fluid coupling as set forth in claim 2 wherein said socket means includes retaining means for engaging said rigid member to hold said rigid member against movement relative to said socket means.

6. A plug assembly for use in connecting a conduit with a socket assembly, said plug assembly comprising a plug body having a first end portion adapted to be connected with the conduit and a second end portion adapted to be received in the socket assembly, said plug body including surface means for defining a passage extending through said plug body between said first and second end portions, said second end portion of said plug body including an outer side surface area, an annular collar circumscribing said second end portion of said plug body and disposed in abutting movable engagement with said outer side surface area, said annular collar having surface means for engaging the socket assembly to hold said collar against movement relative to the socket assembly, and a body of fusible material connected with said plug body and said collar to hold said collar against movement relative to said plug body, said body of fusible material being adapted to fuse at a predetermined temperature to release said plug body and collar for movement relative to each other.

7. A fluid coupling as set forth in claim 6 wherein said second end portion of said plug body includes surface means for defining an annular groove, said body of fusible material being disposed in said groove and extending outwardly from said groove into engagement with said collar.

8. A fluid coupling for use in connecting a pair of fluid conduits in fluid communication, said fluid coupling comprising a socket assembly adapted to be connected with a first one of the conduits, said socket assembly including a socket body having surface means for defining a socket chamber and a retainer member connected with said socket body and movable between an engaged condition and a disengaged condition, a plug assembly adapted to be connected with a second one of the conduits, said plug assembly including a plug body having a leading end portion adapted to be received in said socket chamber, said leading end portion of said plug body having an outer side surface, a ring member having an inner side surface disposed in engagement with said outer side surface of said plug body, said ring member having a side surface which is disposed in slidable abutting engagement with said retainer member when said retainer member is in the engaged condition to hold said ring member against movement relative to said socket body, and a body of fusible material disposed in engagement with said outer side surface of said plug body and said ring member to hold said ring member and plug body against movement relative to each other, said body of fusible material being adapted to fuse at a predetermined temperature to release said ring member and plug body for movement relative to each other.

9. A fluid coupling as set forth in claim 8 wherein said socket assembly further includes spring means for providing a biasing force which moves said plug body at least part way out of said socket chamber upon fusing of said body of fusible material.

10. A fluid coupling as set forth in claim 8 wherein said socket assembly further includes a valve member movable between a closed position blocking fluid flow through said socket body and an open position enabling fluid to flow through said socket body and spring means for urging said valve member toward the closed position, said leading end portion of said plug body including surface means for transmitting force to effect movement of said valve member from the closed position to the open position against the influence of said spring means upon insertion of said leading end portion of said plug body into said socket chamber, said spring means being effective to move said valve member from the open position to the closed position and to move said leading end portion of said plug body at least part way out of said socket chamber upon fusing of said body of fusible material.

* * * * *